(12) United States Patent
Liu et al.

(10) Patent No.: US 10,246,336 B2
(45) Date of Patent: Apr. 2, 2019

(54) METHOD OF MAKING ALKALI ACTIVATED CARBON

(71) Applicant: Corning Incorporated, Corning, NY (US)

(72) Inventors: Jia Liu, Painted Post, NY (US); Daniel Ohen Ricketts, Corning, NY (US); Christopher Mark Schweiger, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 45 days.

(21) Appl. No.: 15/426,358

(22) Filed: Feb. 7, 2017

(65) Prior Publication Data

US 2017/0247259 A1    Aug. 31, 2017

Related U.S. Application Data

(60) Provisional application No. 62/354,936, filed on Jun. 27, 2016, provisional application No. 62/301,179, filed on Feb. 29, 2016.

(51) Int. Cl.
| *C01B 31/12* | (2006.01) |
| *C01B 32/348* | (2017.01) |
| *C01B 32/354* | (2017.01) |
| *C01B 32/342* | (2017.01) |

(52) U.S. Cl.
CPC .......... *C01B 32/348* (2017.08); *C01B 32/342* (2017.08); *C01B 32/382* (2017.08)

(58) Field of Classification Search
CPC .................................................... C01B 32/348
See application file for complete search history.

(56) References Cited

U.S. PATENT DOCUMENTS

| 4,202,868 | A |   | 5/1980 | Hayashi |
| 4,824,479 | A |   | 4/1989 | Matsuoka |
| 4,987,116 | A | * | 1/1991 | Karl ...................... C01B 32/384 |
|           |   |   |        | 502/417 |
| 7,709,415 | B2 |  | 5/2010 | Sugo |
| 8,809,231 | B2 |  | 8/2014 | Liu |
| 8,927,103 | B2 |  | 1/2015 | Kirschbaum |

FOREIGN PATENT DOCUMENTS

| AU | 2009212864 A1 | 3/2010 |
| WO | 2016123172 A1 | 8/2016 |

* cited by examiner

*Primary Examiner* — Stuart L Hendrickson
(74) *Attorney, Agent, or Firm* — Shantanu C. Pathak (57) ABSTRACT

A method of making activated carbon including:
compressing a mixture of carbonaceous source material and an alkali source material into a first solid form; and
activating the first solid form to a form an activated carbon having a second solid form.

23 Claims, 7 Drawing Sheets

METHOD OF MAKING ALKALI ACTIVATED CARBON

This application claims the benefit of priority under 35 U.S.C. § 119 of U.S. Provisional Application Ser. No. 62/354,936 filed on Jun. 27, 2016 and U.S. Provisional Application Ser. No. 62/301,179 filed on Feb. 29, 2016, the content of which is relied upon and incorporated herein by reference in its entirety.

CROSS-REFERENCE TO RELATED APPLICATIONS

The present application is related commonly owned and assigned U.S. application Ser. No. 14/610,752, filed Jan. 30, 2015, entitled "COKE SOURCED ANODE FOR LITHIUM ION CAPACITOR," but does not claim priority thereto.

The present application is also related to commonly owned and assigned U.S. Pat. No. 8,809,231, filed Sep. 28, 2011, entitled "Method for Making Alkali Activated Carbon"; and U.S. Pat. No. 8,927,103, filed Sep. 7, 2012, entitled "Method for Producing Base-Activated Carbon," but does not claim priority thereto.

The entire disclosure of each publication or patent document mentioned herein is incorporated by reference.

BACKGROUND

The disclosure relates to a method of making alkali activated carbon.

SUMMARY

In embodiments, the disclosure provides a method of making alkali activated carbon.

BRIEF DESCRIPTION OF THE DRAWINGS

In embodiments of the disclosure.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed method of making and using provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

Definitions

"Consisting essentially of" or like terms refer to, for example, to a method of making the disclosed activated carbon composition, and articles, devices, or any apparatus of the disclosure, and can include the components or steps listed in the claim, plus other components or steps that do not materially affect the basic and novel properties of the compositions, articles, apparatus, or methods of making and use of the disclosure, such as particular reactants, particular additives or ingredients, a particular agents, a particular surface modifier or condition, or like structure, material, or process variable selected. Items that may materially affect the basic properties of the components or steps of the disclosure or that may impart undesirable characteristics to the present disclosure include, for example, the absence of moisture in the alkali, the absence of VOCs in the carbonaceous source material, and like considerations. For example, a method of making activated carbon can consist of or consist essentially of:

compressing a mixture of carbonaceous source material and an alkali source material into a solid form; and activating the solid form, for example, by heating or irradiating, to make or form a solid form including an activated carbon.

In another example, a method of making activated carbon can consist of or consist essentially of:

combining a carbonaceous source material and a KOH to form a mixture;

compressing the mixture into a solid first form; and activating the first solid form, for example, by heating or irradiating, to make or form a second solid form that includes an activated carbon.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

Alkali activation offers the unique capability of tailoring the pore size distribution of activated carbon in the micropore size range (i.e., pores smaller than 2 nm). Such alkali activated carbon has a significantly higher capacitance than steam activated carbons, which are commercially dominant. However, the cost of alkali activation is traditionally much higher than that of steam activation for a number of reasons, including starting or raw materials, including an alkali (such as KOH), vaporization of alkali metal, corrosion to furnace and crucibles, safety, and like manufacturing considerations. A suitable furnace needs to be able to handle or mitigate the vaporization, corrosion, and safety concerns, and can be costly. It is highly desirable to maximize the throughput in the activation furnace to lower process costs.

Typically, alkali activation involves mixing a powder of a carbonaceous source or starting material and one or more alkali compounds (e.g., KOH, NaOH, $K_2CO_3$, $Na_2CO_3$, and like compounds), loading the mixture in a crucible, and heating the crucible in a furnace. During the heating cycle, the alkali compound(s) melt and react with the carbon material to release gases, with water vapor and hydrogen being the main species. As the gas bubbles evolve from the molten material batch, significant volume expansion of the molten batch and foaming occurs, which expansion and foam limits the amount of material that can be loaded in the crucible and in turn limits the furnace throughput. For instance, only 20 to 30 vol % of material can be loaded in a 100 vol % crucible. Accordingly, if the amount of volume expansion and foaming can be reduced, then more material can be loaded in a given crucible and the furnace throughput can be improved.

Attempts have been made in the prior art to activate carbon in briquette form.

The abovementioned U.S. Pat. No. 8,809,231, mentions a method for activating carbon via alkali activation processes which includes the introduction of water vapor during the activation phase to control the formation of highly reactive by-products. The method includes heating the mixture of a carbon-containing first material and an alkali-containing second material, introducing water vapor at a first threshold temperature and stopping water vapor introduction at a second threshold temperature. The activated carbon material is suitable for carbon-based electrodes and for use in high energy density devices.

U.S. Pat. No. 7,709,415 mentions an activated carbon useful as polarizable electrode material for an electric double-layer capacitor can be obtained by mixing a carbonaceous material and an alkali metal hydroxide while maintaining a solid state, granulating the obtained mixture while maintaining its solid state, dehydrating the obtained granulated substance while maintaining its solid state, and subjecting the granulated dehydration product obtained in the dehydration step to an activation treatment.

The abovementioned commonly owned U.S. Pat. No. 8,927,103 mentions a method for producing activated carbon comprising: a) producing a mixture of a carbon material, a base and a hydrophilic polymer, which polymer is chemically inert with respect to the base; b) compacting the mixture produced in step a) to form a briquette; and c) activating the briquette produced in step b). When such briquettes are activated, the briquettes substantially maintain their solid shapes, and have reduced volume expansion, reduced foaming, reduced alkali metal vaporization, and reduced corrosion.

In embodiments, the present disclosure provides a method of making activated carbon comprising:
  compressing a mixture of carbonaceous source material (e.g., green coke) and an alkali source material (e.g., KOH) into a first solid form (e.g., a briquette, a pellet, and like forms); and
  activating the first solid form (e.g., the briquettes) to make a second solid form (e.g., same or different form as enumerated herein) comprising an activated carbon.

In embodiments, the present disclosure provides a method of making activated carbon comprising:
  compressing a mixture of carbonaceous source material and an alkali source material into a first solid form; and
  activating the first solid form to make a second solid form comprising an activated carbon.

In embodiments, the first solid form can be the same solid form as, or a different solid form from, the second solid form.

In embodiments, the activating of the first solid form can include, for example, a first heating of the first solid form at from 600 to 1000° C., e.g., 650 to 1000° C., 700 to 1000° C., 750 to 1000° C., 800 to 1000° C., 825 to 1000° C., 850 to 1000° C., 900 to 1000° C., including intermediate values and ranges, for from 5 mins to 24 hrs to form a first heated activated carbon.

In embodiments, activating the solid form comprises a first heating of the solid form at from 600 to 1000° C. for from 5 mins to 24 hrs, and for example, from 700 to 1000° C. for from 10 mins to 20 hrs.

In embodiments, activating the first heated solid form can further comprise a second heating of the activated carbon at from 400 to 1000° C. for from 5 mins to 24 hrs, in an inert or reducing atmosphere to form a second heated activated carbon.

In embodiments, the method can further comprise treating the second solid form including activated carbon with at least one of: dispersing the second solid form of the including activated carbon in an aqueous liquid; washing the second solid form with water; washing the second solid form with dilute acid, e.g., aqueous HCl and like acids; repeatedly washing the second solid form, as necessary, until the waste wash water has a pH that is the same as the source wash water; repeatedly washing the second solid form, as necessary, until the waste wash water has a pH of from 4 to 8, repeatedly washing the second solid form, as necessary, until the waste wash water is pH neutral; drying the activated carbon after washing, or a combination thereof.

In embodiments, the compressing can be accomplished, for example, in a suitable press at from 1,000 to 50,000 psi, e.g., 2,000 to 10,000, preferably 3,000 to 8,000, such as 6,000 psi, or like equipment and pressures. In embodiments, the press can be selected, for example, from the group: a roller compactor, a hydraulic press, an iso-static press, or a combination thereof.

In embodiments, the carbonaceous source material can be, for example, a coke and the alkali can be, for example, KOH. In embodiments, the coke and the KOH can be, for example, in a particulate or powder form.

In embodiments, prior to compressing the carbonaceous source and the alkali, separately or in admixture, the admixture can be, for example, preferably in a flowable powder form.

In embodiments, the first solid form can substantially or identically maintain its shape before, and during activating. The first solid form can be achieved and maintained, e.g., without the use of any binder, without a dehydration step, or both. Omitting a binder from the mixture or omitting a dehydration step can provide, for example, reduced volume expansion, reduced foaming, reduced alkali metal vaporization, and reduced corrosion to process equipment. In embodiments, the disclosed method can be free of a binder and free of a dehydration step.

In embodiments, the compressing can be achieved without a binder, and the activating is achieved without a dehydration step.

In embodiments, the second solid form can: substantially or identically maintain its shape after activating; substantially disintegrate and lose its shape upon activating, or a combination thereof.

In embodiments, the disclosure provides a method of making activated carbon comprising: compressing a carbonaceous source material (e.g., green coke) and an alkali (e.g., KOH) to form a mixture, and the compressing is achieved without a binder present or added into the mixture. In embodiments, the compressing can be achieved without a binder being added into the mixture.

In embodiments, the disclosure provides a method of making activated carbon comprising:
  combining (e.g., blending) a carbonaceous source material (e.g., green coke) and an alkali (e.g., KOH) to form a mixture;
  compressing the mixture (e.g., the blended mixture) into a first solid form (e.g., a briquette, pellet, and like forms); and
  activating the solid form (e.g., the briquettes) to a form an activated carbon having a second solid form.

In embodiments, the second solid form (e.g., a briquette), after to activating, can have a density of from 1.0 to 1.8 g/cc, and a form size of, for example, from 0.25 to 3 inches, i.e., 0.635 to 7.62 cm, preferably 0.5 to 1 inch (1.27 to 2.54 cm), i.e., the smallest linear dimension in the first form.

In embodiments, the method of making after the activating, can further comprise, for example, washing and then drying the activated carbon solid form to afford a product having a density of from 0.4 to 0.8 g/cc, and for example, 0.5 to 0.6 g/cc including intermediate values and ranges, such as 0.67 g/cc.

In embodiments, the activated carbon second solid form can have a tap density of from 0.2 to 0.8 g/cc, e.g., 0.3 to 0.5 g/cc, and a BET surface area of from 1200 to 2400 square meters per gram, e.g., 1500 to 2100 $m^2$ per gm.

In embodiments, the carbonaceous source material (e.g., green coke) to alkali (e.g., KOH) can have a weight ratio of from 1:1 to 1:3, including intermediate values and ranges.

In embodiments, the carbonaceous source material (e.g., green coke) to alkali (e.g., KOH) can have a weight ratio of from 1:1.5 to 1:2.5, including intermediate values and ranges.

In embodiments, the first solid form, after compressing but before activation, can have a water content (i.e., primarily mostly as water of hydration of the KOH; very little water from the dried green coke, e.g., less than 1 wt %) of from 0.1 to 16 wt %, including intermediate values and ranges, based on a 100 wt % total of the compressed first solid form.

In embodiments, the first solid form, can have a volatile organic compound (VOC) content of from 0.3 to 16 wt %, such as 0.4 to 16 wt %, and 0.5 to 15 wt %. In embodiments, a green coke can have a VOC of, for example, from 7 to 15 wt %, and needle coke can have a VOC, for example, of from 1 to 3 wt %. In embodiments, needle coke can have volatiles of from 1 to 3 wt %, and green coke can have volatiles of from 7 to 8 wt % in a batch. In another batch, green coke can have volatiles of about 12 wt %. In another green coke batch the green coke can have volatiles of about 1 to 15 wt %. In embodiments, in a batch of a mixture of needle and green cokes, the coke can have two preferred volatile ranges such as of from 1 to 4 wt % for the needle coke, and of from 7 to 12 wt % for the green coke. In embodiments, the alkali selected or the coke selected can be pretreated prior to compressing, for example, to remove water or to remove VOC.

In embodiments, the first solid form, prior to heat treatment in activation, can have a volatile organic compound (VOC) content in the solid form briquettes of, for example, from 1 to 10 wt %, i.e., arising substantially or entirely from the green coke since the green coke can be pre-dried whereas the alkali (e.g., KOH) preferably is not pre-dried. In embodiments, the volatile organic compound (VOC) content of the solid form or of the carbon source (i.e., green coke), can be, for example, from 2 to 9 wt %, more preferably from 3 to 8 wt %, even more preferably from 4 to 7 wt %, such as from 4 to 6 wt %, including intermediate values and ranges.

In embodiments, the first solid form has a shape that can be selected, for example, from the group consisting of: a briquette, a pellet, or a mixture thereof, and the second solid form has a shape that can be selected, for example, from the group consisting of: a briquette, a pellet, a powder, a fragment, a crumb, or a mixture thereof. Examples of disintegration forms of the second solid form include a powder, a fragment, a crumb, and like disintegration forms, or a mixture thereof.

In embodiments, the carbonaceous source material can be, for example, a coke selected from the group consisting of green coke, calcined coke, needle coke, petroleum coke, coal-based coke, isotropic coke, anisotropic coke, honeycomb coke, sponge coke, shot coke, fuel-grade coke, calcinable grade coke, anode grade coke, or mixtures thereof.

In embodiments, the carbonaceous source material can preferably be, for example, green coke, calcined coke, or mixtures thereof.

In embodiments, the first solid form can disintegrate during activation to produce the second solid form having one or more shapes selected from, for example: reduced size pieces, fragments, particles, or mixtures thereof.

In embodiments, the second solid form can have a low net vertical height expansion property in an activation container, for example, of from 0.1 to 100% vertical height expansion during activation relative to the first solid form, i.e., for example, from a zero or near zero vertical height change to about a doubling in the vertical height change due to expansion of the first form while transforming to the second form during or as a result of activation relative to the reference vertical height of the first solid form.

In embodiments, the first solid form has a fill volume in a container of from 0.1 to 100 vol %, and the second solid form has a post-activation fill volume in the container of 50 to 200 vol % based on the first solid form fill volume, with the proviso that the first solid form has a fill volume selected such that there is no overflow of the second solid form from the container, e.g., the first solid form is placed in the container to a container fill volume from 0.1 to 100 vol % of the available container volume. In embodiments, the extent of volume expansion or fill height expansion can be pre-determined experimentally to avoid an over fill or overflow situation, and the experimental determination is a suitable predictor useful for scaled up methods of making.

In embodiments, the first solid form can have a fill volume in a container of, for example, from 25 to 80 vol % relative to the empty container volume, and the second solid form can have a post-activation fill volume of, for example, from 75 to 125 vol % relative to the fill volume of the first solid form. A post-activation fill volume of 75 vol % of the second form is typical where there is some shrinkage and disintegration of the first solid form transforming to the activated second solid form. A post-activation fill volume of 100 vol % is typical where there is typical expansion with or without accompanying disintegration or shrinkage.

In embodiments, the first solid form can have representative dimensions of, for example, from: height (H) 10 to 150 mm; length (L) of from 10 to 150 mm; and width (W) 10 to 150 mm. In embodiments, the smallest dimension (e.g., W) of first solid form is preferably less than, for example, 125 to 130 mm (about 5 inches), 85 to 95 mm (about 3.5 inches), and 45 to 55 mm (about 2 inches), including intermediate values and ranges. In embodiments, the intermediate and largest dimensions (e.g., H or L) of first solid form can be any suitable size.

In embodiments, the first solid form can have representative dimensions of, for example, from: a height (H) 10 to 35 mm; a length (L) of from 10 to 35 mm; and a width (W) 10 to 25 mm, including intermediate values and ranges. In embodiments, the representative dimensions can preferably be, for example, H of 10 to 30 mm; L of 15 to 30 mm; and W of 15 to 25 mm, and more preferably H of from 30 mm; L of from 20 mm; and W of 15 mm, including intermediate values and ranges. In embodiments, the first solid form can have a three dimensional shape of, for example, a cube, a brick, a parallelogram, a rhombus, a sphere, an ovoid, and like shapes. The three dimensional shape of the first solid form can be determined by, for example, the compression method, the extent of compression, the mold shape selected, and like dimensionally determinative considerations.

In embodiments, the first solid form has dimensions that are the same as, or different from, the dimensions of the second solid form, and the second solid form comprises a mixture of an activated carbon and a reaction product of the alkali source material, e.g., potassium or sodium compounds such as $K_2CO_3$, $Na_2CO_3$, and like compounds.

In embodiments, the disclosure provides a method of making activated carbon comprising:
  combining a carbonaceous source material and a base of the formula MOH where M is K, Na, or mixtures thereof, to form a mixture;
  compressing the mixture into a first solid form; and
  activating the first solid form to form a second solid form comprising an activated carbon.

In embodiments, the disclosed method has at least one or more of the following advantages:

In contrast to the abovementioned U.S. Pat. No. 8,927,103, the presently disclosed process doesn't require any organic binder material to be added to the carbon source and alkali mixture to maintain the integrity of the first solid form after compressing. A binder additive-free process reduces raw material cost since the binder is sacrificial and doesn't become part of the activated carbon product in any substantial amount. Also, the binder, being an organic material, can consume part of the alkali through, for example, acid-base interactions, and lower the effectiveness of the activation at the same alkali to carbon ratio. Additionally, the mixing of source materials is simplified without an additive, particularly compared to a liquid additive, which can be a challenge due to clumping when a liquid is combined and contacted with a solid dry powder.

A dehydration step is not necessary. The dehydration process disclosed in the abovementioned U.S. Pat. No. 7,709,415 is expensive and can be difficult to control in that it requires the material to maintain a solid state in all steps, it requires heating under vacuum, and since alkali has a strong affinity for water and the water in the alkali (i.e., water of hydration or deliquescence) can lower the melting point significantly.

Low cost alkali can be used, which can contain a significant amount of water (e.g., 1 to 15 wt %).

Combination of the above features enables a low cost process due to lower material cost, higher throughput in a given furnace, and no costly ancillary steps.

In embodiments, the disclosed solid form comprised of, for example, the compressed green coke and alkali mixture, and free of binder, was unexpectedly found to be stable against melting, and stable against significant solid form degradation or disintegration when heated to, for example, from 500 to 1000° C., and the disclosed solid form was satisfactory for subsequent washing and thermal activation processing.

EXAMPLES

The following Examples demonstrate making, use, and analysis of the disclosed compositions and methods in accordance with the above general procedures.

Example 1

Preparation of Activated Carbon

Figure 1A:
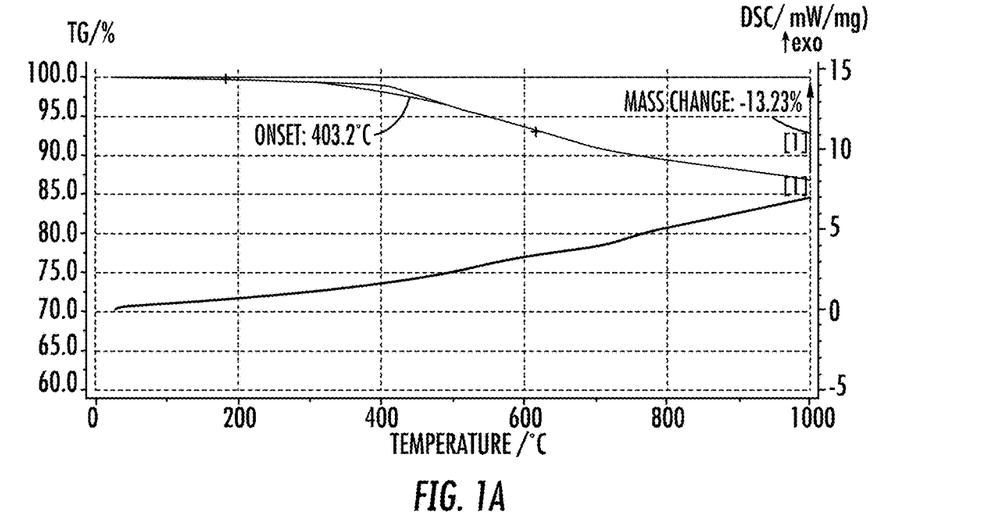
FIGS. 1A and 1B show TGA-DSC results of dried green coke powders: Rodeo green coke (1A); and Humber regular green coke (1B).

A Rodeo green coke (from Phillips 66), was dried in a retort furnace under $N_2$ purge at 125° C. overnight and then milled to a fine powder with a d50 of about 5 microns. A sample of the powder was tested using DSC-TGA (ramp 10° C./min to 1000° C. under nitrogen) as shown in FIG. 1A. Note that this coke material had significant amount of non-aqueous volatiles as indicated by the weight loss of 13.2 wt %. The green coke can be wet milled or preferably dry milled to the fine powder.

The green coke powder was then mixed with a KOH powder (from Sigma-Aldrich) (Cat. No. 06103, technical grade, greater than 85 wt %), at a green coke:KOH weight ratio of 1:2. Mixing was accomplished in a Henschel mixer with a mixing speed of 2000 rpm for 15 mins.

The mixture was then pressed into a solid body (i.e., "briquette") using an iso-static press at a pressure of 6000 psi. The resulting briquette was in the shape of cylinder with a weight of 400 grams, a diameter of approximately 6 cm, a height of approximately 12 cm, and a density of approximately 1.4 g/cc. Although not limited by theory it is believed that the presence of moisture in the KOH (e.g., up to 15 wt %) and volatiles in the green coke facilitated the formation of the solid pressed body showing good mechanical strength during handling in the subsequent experiment steps. A total of four briquettes were prepared.

Calculations:

Moisture ($H_2O$) Content in the Briquettes:
If assuming 15 wt % water in the KOH (⅔ by wt.) and a negligible amount of water in the green coke (⅓ by wt.; which was pre-dried), then 15 wt %×⅔=10 wt %.
If assuming 1.5% water in the KOH and a negligible amount of water in the green coke (⅓ by wt.; pre-dried), then 1.5 wt %×⅔=1 wt %

VOC (Volatile Organic Compound) Content in the Briquettes: 13 wt %*⅓=4.3 wt %

Prior to activation, three of the briquettes were broken into small size pieces with target dimensions of about one-half inch to one inch (½ to 1") while the fourth briquette was kept intact. A first crucible (e.g., a gallon-size paint can from Uline, having about a 5 mm hole punched in the lid) was filled with 100 g of the briquette pieces. A first crucible, same as the first one, was filled with 900 g of the briquette pieces. The fully intact fourth briquette was placed in a third crucible, made of SiC and having a nickel lid also having about a 5 mm hole. All three crucibles were loaded into a retort furnace (CM Furnaces, model CF1216FL). The thermal cycle was as follows: ramp up at 260° C/hr to 850° C., soak at 850° C. for 2.4 hrs, furnace cool. The furnace was purged with 40 SLPM of nitrogen throughout the cycle. As shown in FIGS. 2A to 2G the briquette pieces or the fully intact briquette retained their solid shapes without significant melting or disintegration after activation. FIGS. 2A to 2G shows images of briquettes before and after activation in Example 1: Crucible 1 pre-activation (2A); Crucible 1 post-activation (2B); Crucible 2 pre-activation (2C); Crucible 2 post-activation top layer (2D); Crucible 2 post-activation bottom layer (2E); Crucible 3 pre-activation (2F); and Crucible 3 post-activation (2G).

The product of the thermal activation, either briquettes or pieces having reduced sizes, were not ground or pulverized. Instead, the product was contacted with water to produce a dispersion or suspension of the activated carbon in water. The material in each crucible was washed and filtered first with DI water 3 times, then with aqueous 10% HCl twice, and finally with DI water until pH of the filtrate became about the same (tested with pH paper strips) as that of source DI water. For the second crucible (with 900 g of briquette pieces), the pieces in the top half and the pieces in the bottom half were washed separately and subjected to the heat treatment process (see below). Finally, all washed carbon batches were heat treated at 900° C. for 2 hours under 1% $H_2/N_2$.

Example 2

Preparation of Activated Carbon

Figure 1B:
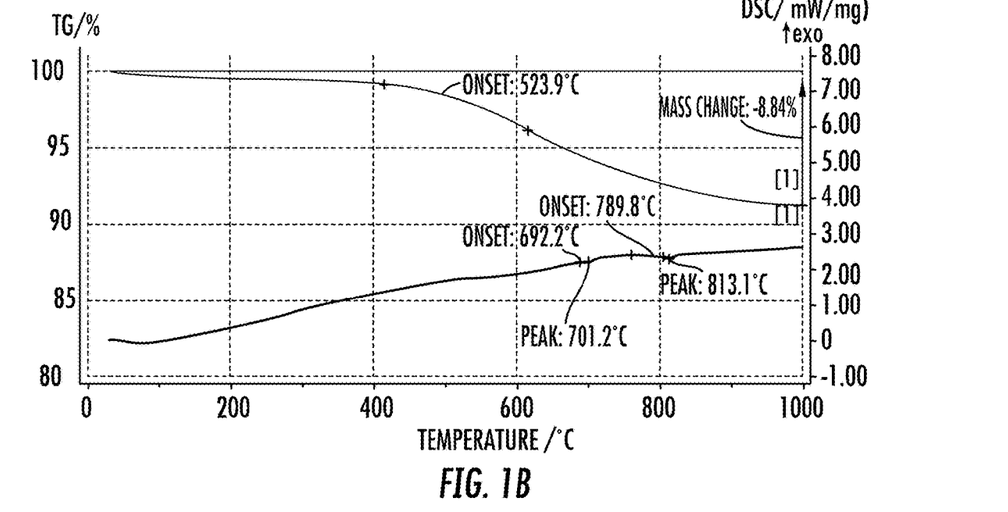
Figure 2A:
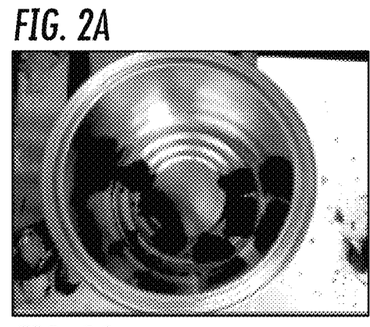
FIGS. 2A to 2G show images of briquettes before and after activation in Example 1.
Figure 2B:
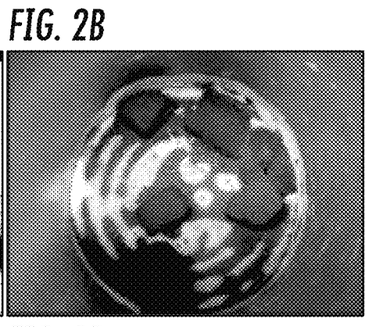
Figure 2C:
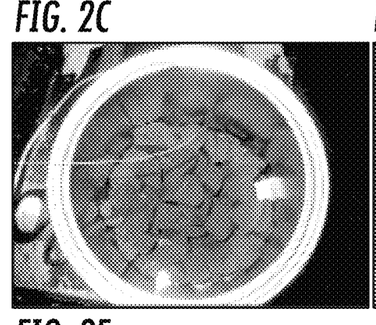
Figure 2D:
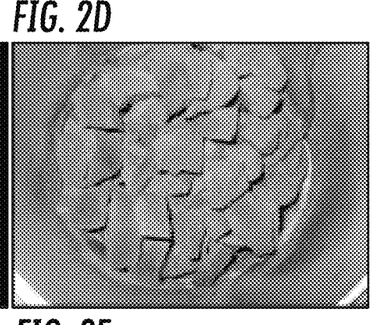
Figure 2E:
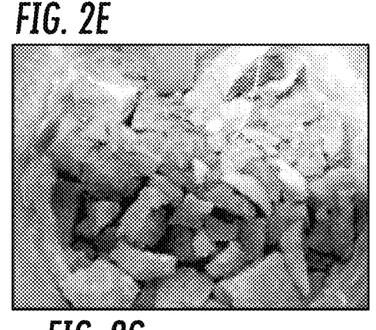
Figure 2F:
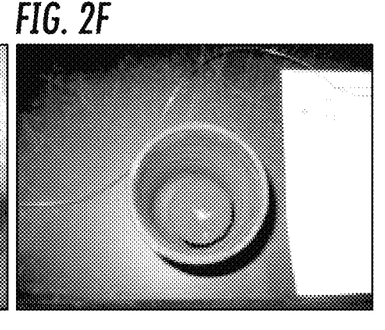
Figure 2G:
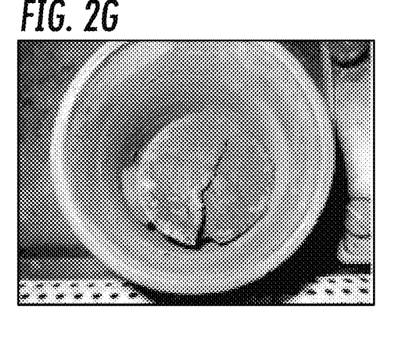

Example 1 was repeated with the exception that: a Humber Regular green coke (from Phillips 66), was used instead of the Rodeo green coke; and a green coke:KOH weight ratio of 1:2.2 was used instead of 1:2 ratio. The DSC-TGA (ramp 10° C./min to 1000° C. under nitrogen) chart of the dried and milled Humber Regular green coke is shown in FIG. 1B.

Figure 3A:
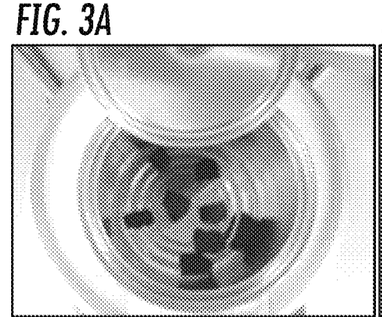
FIGS. 3A to 3G show images of briquettes before and after activation in Example 2.
Figure 3B:
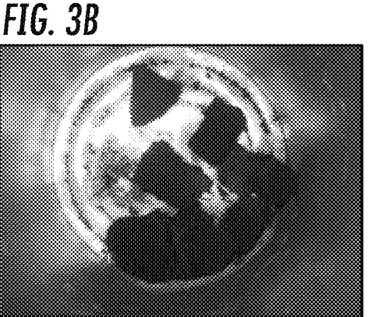
Figure 3C:
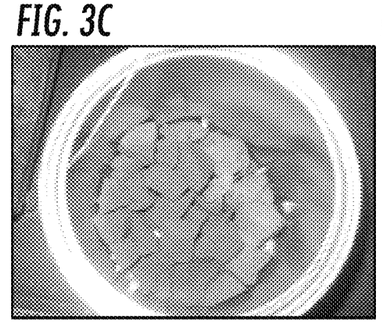
Figure 3D:
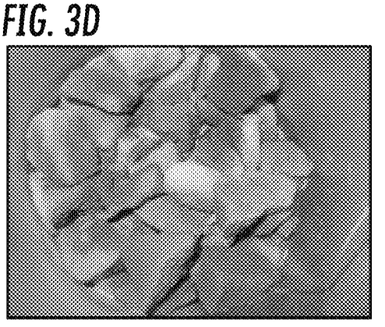
Figure 3E:
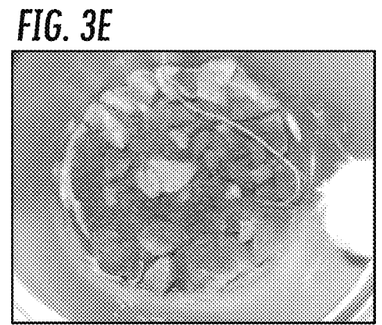
Figure 3F:
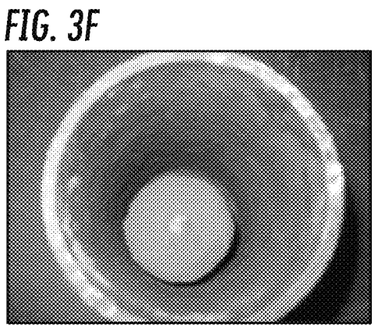
Figure 3G:
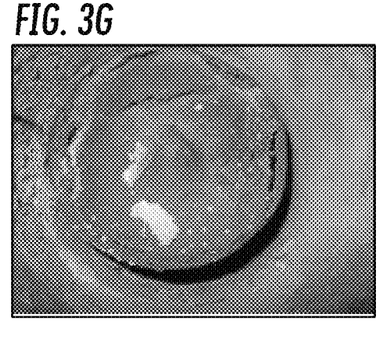

As shown in FIGS. 3A to 3G, the briquette pieces or the fully intact briquette again retained their solid shapes without significant melting or disintegration after activation. FIGS. 3A to 3G show images of briquettes before and after activation in Example 2: Crucible 1 pre-activation (FIG. 3A); Crucible 1 post-activation (FIG. 3B); Crucible 2 pre-activation (FIG. 3C); Crucible 2 post-activation top layer (FIG. 3D); Crucible 2 post-activation bottom layer (FIG. 3E); Crucible 3 pre-activation (FIG. 3F); and Crucible 3 post-activation (FIG. 3G).

Example 3

Scale-up Preparation of Activated Carbon

Example 1 was repeated with the exception that: a green coke (from Humber) was used instead of the Rodeo green coke; a green coke:KOH weight ratio of 1:2.2 was used instead of 1:2 ratio; a total of 10 briquettes were prepared and were all broken into smaller pieces; a single rectangular shaped crucible was used (dimensions 30 cm width×30 cm length×13 cm height); and a larger quantity of compressed material (that is 3.6 kilograms of briquette pieces), were loaded in the crucible for activation. Note that the fill depth or height of solid form compressed briquette pieces of about ⅔ to ¾ by volume full ("i.e., fill volume") in this larger crucible was comparable to that in crucible 2 in Examples 1 and 2. This comparable fill depth or height was targeted when scaling from a smaller crucible to a larger crucible. The fill volume can be, for example, from ⅔ to ¾ by volume full of the total fill depth or height or volume of the container without risking overflow losses. Accordingly, the throughput of the presently disclosed process can be increased by, for example, from 25 (¼ vol) to 33 (⅓ vol) vol % or more compared to the prior art Comparative Example 4 process.

Figure 4A:
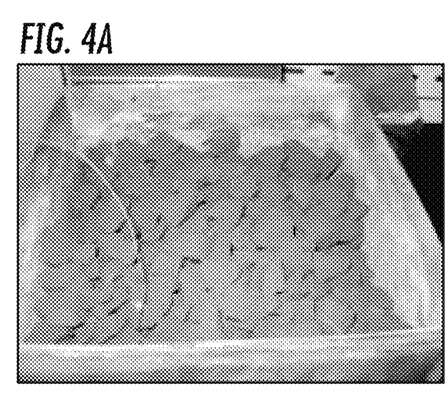
FIGS. 4A to 4C show images of briquettes before and after activation in Example 3.
Figure 4B:
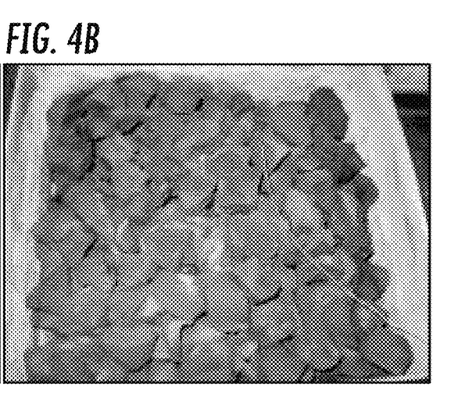
Figure 4C:
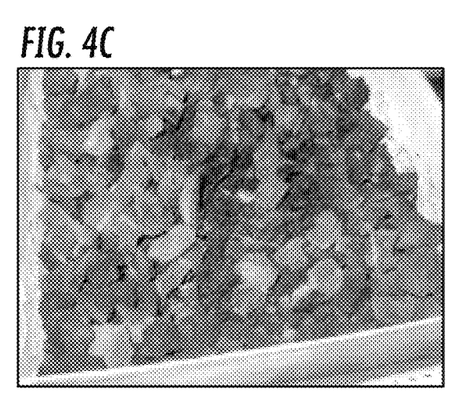

As shown in FIGS. 4A to 4C, the briquette pieces again retained their solid shapes without significant melting or disintegration after activation. FIGS. 4A to 4C show images of briquettes before and after activation in Example 3: Pre-activation (4A); Post-activation top layer (4B); and Post-activation bottom layer (4C).

Comparative Example 4

Scale-up Preparation of Activated Carbon with Binder

Example 3 was repeated with the exception that: a Rodeo green coke was used instead of the Humber green coke; a green coke:KOH weight ratio of 1:2 was used instead of 1:2.2 ratio; a binder, polyethylene glycol (PEG)(molecular weight 200, Sigma-Aldrich Cat. No. P3015), was used in the briquettes at a green coke:binder weight ratio of 1:0.1.

Figure 5A:
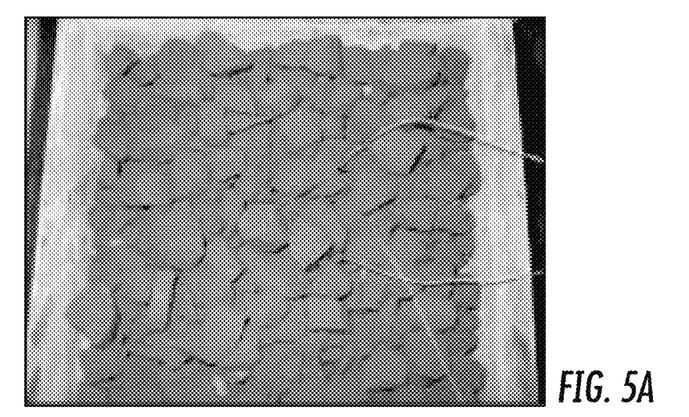
FIGS. 5A to 5C show images of briquettes before and after activation in Example 4.
Figure 5B:
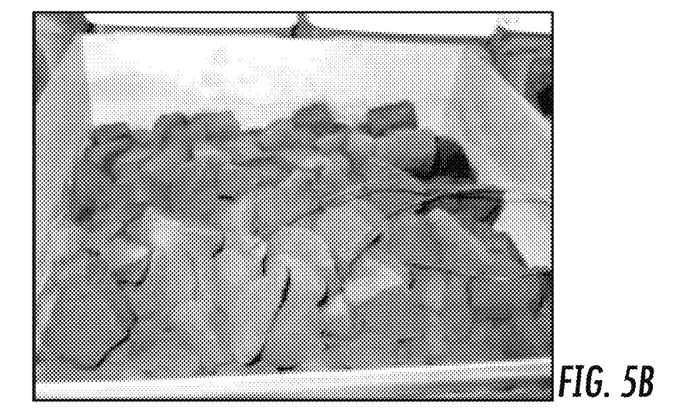
Figure 5C:
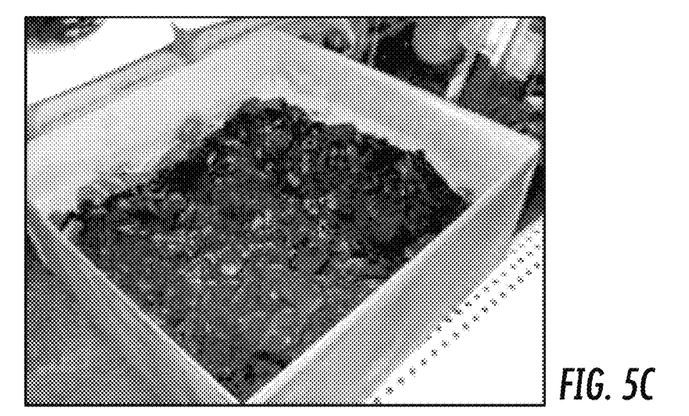

As shown in FIGS. 5A to 5C, the briquette pieces retained their solid shapes in the top layer, but became increasingly powdery and fused toward the bottom of the crucible. FIGS. 5A to 5C show images of briquettes before and after activation in Comparative Example 4: Pre-activation (5A); Post-activation top layer (5B); and Post-activation bottom layer (5C). The fill depth or height, and the fill volume of this comparative example can be, for example, from ⅓ to ½ by volume full of briquette pieces of the total fill depth or height, and the fill volume of the container without risking overflow losses.

From the above working examples, it can be seen that the inventive briquettes formed without any added organic binder or without a dehydration step showed surprisingly good mechanical properties and stability during activation. Specifically, the control briquettes made with a binder (Comparative Example 4) showed no advantage or were even somewhat worse in terms of stability.

Measurement of specific capacitance and surface area of disclosed and comparative activated carbon products is listed in Table 1. Table 1 lists the characterization results including specific capacitance (Csp, mass (m) in Farads per gm; and volume (v) in Farads per cc) and surface area (by the BET method) for the carbon samples prepared in the above Examples 1 to 3 and Comparative Example 4.

TABLE 1

Characterization results for activated carbon samples from Examples 1 to 4.

|  | 100 g pieces | 900 g pieces top | 900 g pieces bottom | Large Briquette |
|---|---|---|---|---|
| Example 1 |  |  |  |  |
| Csp, m (F/g) | 165 | 152 | 160 | 152 |
| Csp, v (F/cc) | 92 | 94 | 96 | 95 |
| BET Surface Area (m²/g) | 2141 | 1727 | 2000 | 1839 |
| Example 2 |  |  |  |  |
| Csp, m (F/g) | 141 | 177 | 197 | 165 |
| Csp, v (F/cc) | 91 | 96 | 92 | 91 |
| BET Surface Area (m²/g) | 1521 | 1903 | 2320 | 1785 |

|  | Example 3 (Humber Regular green coke): 3.6 kg pieces all carbon mixed | Comparative Example 4 (Conoco Rodeo green coke): 3.6 kg pieces all carbon mixed |
|---|---|---|
| Csp, m (F/g) | 142 | 147 |
| Csp, v (F/cc) | 91 | 98 |
| BET Surface Area (m²/g) | 1524 | 1655 |

Example 5

Scale-up preparation of activated carbon free of binder

Figure 6A:
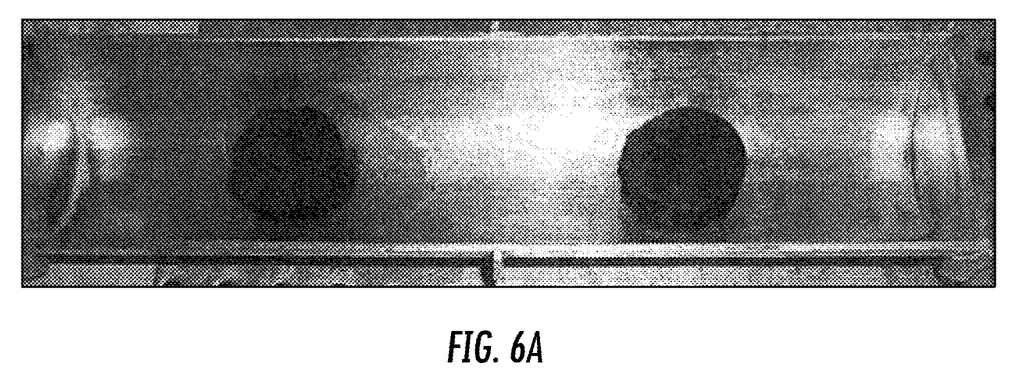
FIGS. 6A and 6B show images of briquettes or pellets before (6A; top) and after (6B; bottom) activation and having some disintegration of the briquettes or the pellet forms going from the first form to the second form, and as described in Example 5.
Figure 6B:
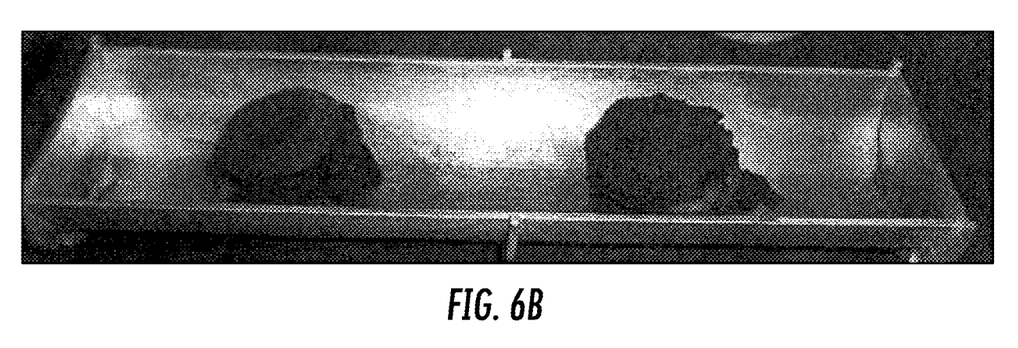
Figure 7:
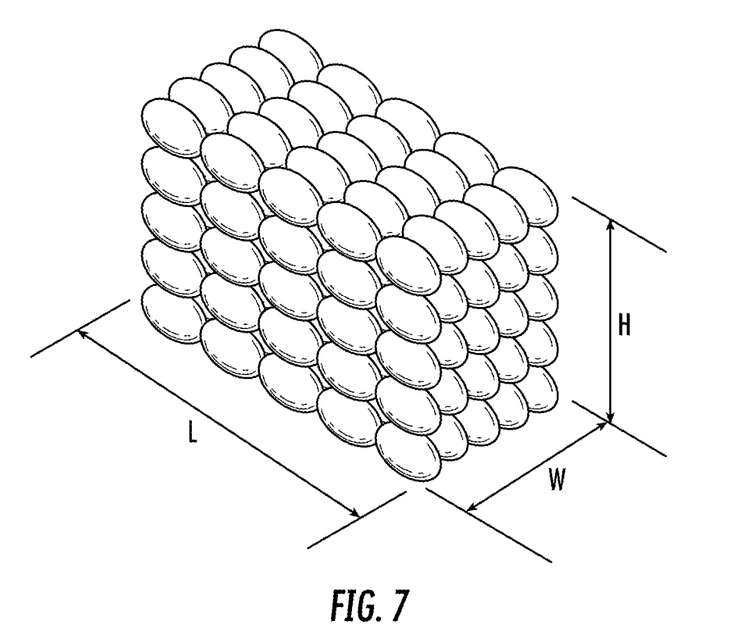
FIG. 7 shows a hypothetical close pack arrangement of compressed briquettes or pellets in an arbitrary volume and having an adequate void volume (i.e., the interstices between pellets) that permits an amount of swelling of individual briquettes or pellets but without significant or excess swelling or expansion of the overall arbitrary volume.

FIGS. 6A and 6B illustrate partial break down and expansion of individual briquettes. Coke and KOH only were combined in a mixer and no volume or size changes were observed or expected due to the mixing. The coke used was a needle coke. The mixture of needle coke and KOH was pressed into pellets using a manual press to form the first solid form. The first solid form or post-press pellet dimensions had for an ovoid, for example, a long dimension L=38 mm, and a short dimension H=17 mm, and the post press density was 1.5 g/cc. Partial break down or disintegration of the second solid form after activation was observed. The pellet expansion and fill volume expansion was estimated at about 2.4 times based on observing changes and measuring changes in the fill height and the diameter of the resulting second form compared to the first form. The pre-activated briquette packing density can be, for example, about a 50 vol %, a solid to void volume ratio of about 1:1 by volume. An idealized briquette packing density is shown in FIG. 7.

In practice, the briquette packing can be considerably more random but provides a similar volume fill ratio, for example: a rectangular volume of about 30 (L)×30 (H)×5.5 (W) of 4950 cc; a material density of 1.3 g/cc; a material weight of 3600 g; a material volume of 2770 cc; and a packing ratio of (2770/4950)×100=55.9 vol %. In embodiments, individual briquette volume expansion during the activation process does not exceed 250 vol %, and preferably less than about 200 vol % volume expansion. Briquette expansion, if any, occurs within gaps between briquettes, resulting in limited to, or no increase, in overall volume occupied by the briquettes. An itemized summary and illustrative sample calculation follows:

Packed briquette volume within a tray or crucible (e.g., a Sagger) is 0.5×2.5 or a post-activation packing density of 100 to 125 vol %;

Net height expansion of first solid form that has been packed in the crucible, is about 25 vol % (i.e., a maximum overall height (H) increase of 25%); and Net volume expansion of the carbonaceous material packed in the crucible was 0 vol %. Table 2 lists a tabulation of volume characterization and calculations for an activated carbon sample prepared in Example 5.

TABLE 2

Tabulation of volume characterization for an activated carbon of Example 5.

| Briquette Metric | Model Stacked Briquette Measures |
|---|---|
| single briquette ave. volume | 3.98 cc |
| total vol – cube (briquette extent and preactivation vol) | 1064 cc (14.0 × 9.5 × 8.0) (5 × 5 × 5) |
| # briquettes in a container or crucible cell | 125 |
| total briquette vol @ 125 briquettes | 493.75 cc |
| packing density (total briquette vol over total container vol) | 493.75/1064 = 46.4% |

The disclosure has been described with reference to various specific embodiments and techniques. However, it should be understood that many variations and modifications are possible while remaining within the scope of the disclosure.

What is claimed is:

1. A method of making activated carbon comprising:
   compressing a mixture of carbonaceous source material and an alkali source material in a press at a pressure ranging from 1,000 to 50,000 psi to produce a first solid form, wherein the mixture does not comprise a binder; and
   activating the first solid form to make a second solid form comprising an activated carbon, wherein the method does not comprise a dehydration step.

2. The method of claim 1 wherein activating the first solid form comprises a first heating of the first solid form at from 600 to 1000° C. for from 5 mins to 24 hrs to form a first heated activated carbon.

3. The method of claim 2 further comprising a second heating of the first heated activated carbon at from 400 to 1000° C. for from 5 mins to 24 hrs, in an inert or reducing atmosphere to form a second heated activated carbon.

4. The method of claim 1 further comprising treating the second solid form with at least one of: dispersing the second solid form in an aqueous liquid; washing the second solid form with water; washing the second solid form with dilute acid; washing the second solid form until the waste wash water has a pH that is the same as the pH of the source wash water; washing the second solid form until the waste wash water has a pH of from 4 to 8, washing the second solid form until the waste wash water is pH neutral; drying the second solid form after washing, or a combination thereof.

5. The method of claim 1 wherein the press is chosen from a roller compactor, a hydraulic press, an isostatic press, or a combination thereof.

6. The method of claim 1 wherein the carbonaceous source material is a coke and the alkali source is KOH, and the coke and the KOH are in a powder form.

7. The method of claim 1 wherein:
the first solid form maintains its shape before and during activating; and
the second solid form: maintains its shape upon activation; substantially disintegrates and loses its shape upon activation; or a combination of maintaining and losing its shape upon activating.

8. The method of claim 1 wherein the resulting compressed first solid form, before activating, has a density of from 1.0 to 1.8 g/cc, and a form size of from 0.25 to 3 inches.

9. The method of claim 1 further comprising after activating, washing and then drying the activated carbon second solid form to afford a dry activated carbon powder having a tap density of from 0.2 to 0.8 g/cc, and a BET surface area of from 1200 to 2400 square meters per gram.

10. The method of claim 1 wherein the carbonaceous source material to the alkali source has a weight ratio of from 1:1 to 1:3.

11. The method of claim 1 wherein the carbonaceous source material to the alkali source has a weight ratio of from 1:1.5 to 1:2.5.

12. The method of claim 1 wherein the first solid form, after compressing, has a water content of from 0.1 to 15 wt % based on a 100 wt % total of the compressed first solid form.

13. The method of claim 1 wherein the first solid form, after compressing but before activation, has a volatile organic compound (VOC) content of from 0.1 to 16 wt %.

14. The method of claim 1 wherein the first solid form has a shape selected from the group consisting of: a briquette, a pellet, or a mixture thereof, and the second solid form has a shape selected from the group consisting of: a briquette, a pellet, a powder, a fragment, a crumb, or a mixture thereof.

15. The method of claim 1 wherein the carbonaceous source material is a coke selected from the group consisting of green coke, calcined coke, needle coke, petroleum coke, coal-based coke, isotropic coke, anisotropic coke, honeycomb coke, sponge coke, shot coke, fuel-grade coke, calcinable grade coke, anode grade coke, or mixtures thereof.

16. The method of claim 1 wherein the carbonaceous source material is green coke, calcined coke, or mixtures thereof.

17. The method of claim 1 wherein the first solid form disintegrates during activation to produce the second solid form having one or more shapes of: reduced size pieces, fragments, particles, or mixtures thereof.

18. The method of claim 1 wherein the second solid form has a low net vertical height expansion property in an activation container of from 0.1 to 100% vertical height expansion during activation relative to the first solid form.

19. The method of claim 1 wherein the first solid form has a fill volume in a container of from 0.1 to 100 vol %, and the second solid form has a post-activation fill volume in the container of 50 to 200 vol % based on the first solid form fill volume, with the proviso that the first solid form has a fill volume selected such that there is no overflow of the second solid form from the container.

20. The method of claim 1 wherein the first solid form has a fill volume in a container of from 25 to 80 vol % relative to the empty container volume, and the second solid form has a post-activation fill volume of 75 to 125 vol % relative to the fill volume of the first solid form.

21. The method of claim 1 wherein the first solid form has dimensions of from: height (H) 10 to 150 mm; length (L) of from 10 to 150 mm; and width (W) 10 to 150 mm.

22. The method of claim 1 wherein the first solid form has dimensions that are the same as, or different from, the dimensions of the second solid form, and the second solid form comprises a mixture of an activated carbon and a reaction product of the alkali source material.

23. A method of making activated carbon comprising:
combining a carbonaceous source material and a base of the formula MOH where M is K, Na, or combinations thereof, to form a mixture, wherein the mixture does not comprise a binder and wherein the base is in powder form;
compressing the mixture into a first solid form; and
activating the first solid form to form a second solid form comprising an activated carbon, wherein the method does not comprise a dehydration step.

* * * * *